May 22, 1951  E. A. ERMOLD  2,554,099

MEASURING RULE

Filed Feb. 15, 1946

INVENTOR
ELMER A. ERMOLD
BY
Barr, Borden & Fox
ATTORNEYS

Patented May 22, 1951

2,554,099

UNITED STATES PATENT OFFICE 2,554,099

MEASURING RULE

Elmer A. Ermold, Philadelphia, Pa.

Application February 15, 1946, Serial No. 647,949

3 Claims. (Cl. 33—107)

This invention relates to measuring rules, and pertains particularly to rules capable of measuring inches or other units and minute parts or subdivisions of inches or such other distance units.

It is among the objects of this invention: to improve the art of measuring rules; to provide a measuring rule with a quick and easy adjustment whereby minute portions of the unit measurement can be delineated; to improve the art of transcribing distances from a rule; to provide a rule with means for guiding a marking stylus for accurate and facile indication of limits of linear distances; to provide a rule by which distances can readily be measured and transferred to a surface, with the distances being accurately and easily subdivided into subdivisions representing thousandths of an inch; to provide a rule with subdivisions, each ten times smaller than the greatest subdivision now possible to obtain with a conventional steel scale; to provide the division of space into minute subdivisions and the transcribing of a selected distance to a surface with ease and accuracy and without the necessity for the use of a magnifying glass or the like; to provide a rule by which extremely small subdivisions of units can be secured with a vernier- or micrometric-like accuracy, without the delay and complication and size of providing and using an actual vernier scale; to provide an extension for a rule such that minute subdivisions can be easily and quickly ascertained and measured by a graduated dial rotatable about an axis normal to the axis of the paper and of the rule, so that no interference with the observation or recordation of the ascertained distance need occur; and many other objects and advantages will become more apparent as the description proceeds.

In the accompanying drawings forming part of this description:

Figure 1:
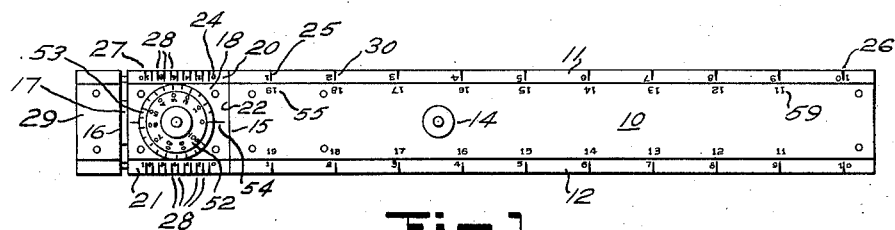
Fig. 1 represents a plan of an illustrative embodiment of the invention.
Figure 2:
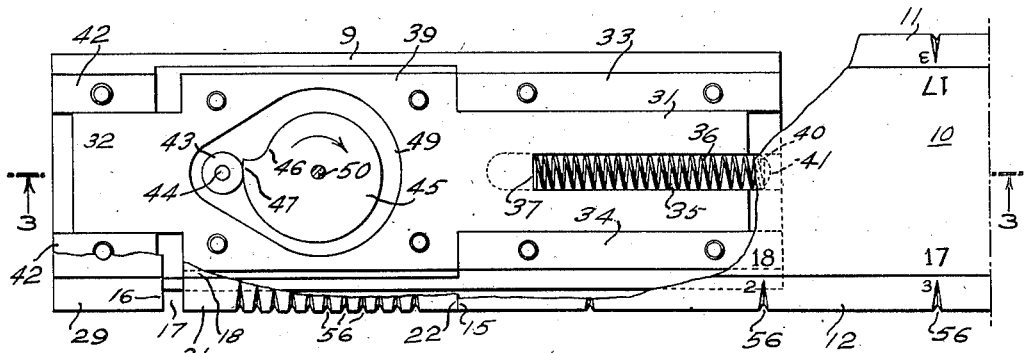
Fig. 2 represents a fragmentary enlarged plan of the subdivision portion of the rule, with the upper plate thereof partially removed and with the planar cam mounted on and movable with the upper plate in parallelism therewith in one extreme positioning, relative to the bodily fixed roller mounted rotatably on the stationary portion of the rule.
Figure 3:
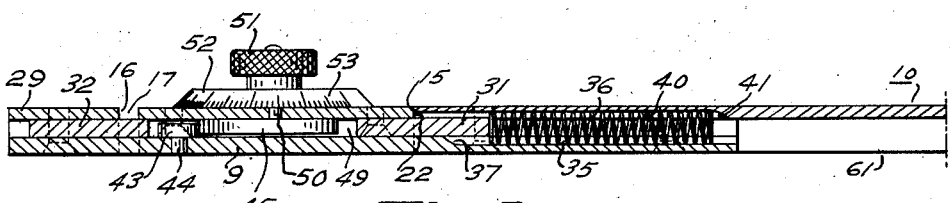
Fig. 3 represents a longitudinal section taken on line 3—3 of Fig. 2.

In carrying out the invention in a preferred but illustrative embodiment, a rule or scale is provided having a fixed portion graduated into suitable distance-measuring units, say, illustratively into inches, and a slidable sub unit movable on the fixed scale through a small distance longitudinally of the fixed scale, which restricted distance is illustratively one-tenth of the unit divisions on the fixed scale. The slidable element carries the zero graduation for the ruler, and is spring-biased in one direction to cause a constant rise cam rotatable on an axis normal to the slidable element to bear constantly against a bodily fixed main scale-mounted rotatable roller element, and the cam rise is coordinated with graduations radially of the cam axis by which illustratively one hundred evenly spaced subdivisions of the larger unit illustrative subdivisions are indicated and by reference to which, against a fixed datum line on the slidable element, the cam can be positioned to subdivide the unit subdivision into still further minute subdivisions, as an addition to a given distance by suitable shifting of the zero relative to fixed graduations on the scale. Illustratively, as noted, the knob of the cam moves relative to one hundred evenly spaced graduations, each of which, in angular setting of the cam, effects a change in the setting of the zero point of one thousandth of an inch from its datum true zero position, which is readily seen and applied without the use of magnifying glasses or the like.

The rule 10 is a shell of any desired length and the working face thereof is provided with at least one indicating sloping edge surface 11. For convenience and to meet all requirements, a second sloping edge 12 is provided, which is the equivalent and a duplicate for all purposes of edge 11, so that the description of the invention will be confined to this latter edge. The outer or working surface of the rule is interrupted toward one end by the transverse edge 15 normal to the edge of the sloping edge surface 11, and by the parallel spaced transverse edge 16 connected by a supporting strip 9. Edges 15 and 16 define a space 17, longitudinal of the rule, in which there is slidably movably mounted a sub-unit shell 18 mounted on a plate 39 to be described. The latter has a sloping edge surface 20 aligned with the sloping surface 11 of the fixed portion of the ruler. If provided with duplicate edges, an additional short complemental sloping surface 21 is also provided, coextensive with the rearward sloping surface 12 of the fixed ruler portion.

With the slidable element 18 so disposed that its lateral edge 22 abuts the first mentioned transverse edge 15, as shown in Fig. 1, a zero graduation 24, on the edge 20 of the slidable portion is exactly one unit away from the graduation No. 1, shown at 25 in Fig. 1, so that when the units are inches it is exactly a full inch between zero 24 and graduation No. 1 at 25. The remainder of the fixed rule portion, to the right in Fig. 1, is similarly serially graduated to a final graduation at 26, the number of which depends upon the desired length of the rule. It will be observed that in effectiveness at this point a distance can be measured starting at zero on the slidable element 18 and going to the furthest graduation at 26 for the linear dimension measured.

In the slidable element 18 of the rule, however, the edge 20 is also marked off from the zero point 24 at one end at the right, to a final point 27 at the left end, and delineating one full inch between these marks, and this inch space is graduated into ten equal subdivisions, obviously respectively spaced one-tenth of an inch apart, as indicated at 28. As previously noted, it will be understood that the slidable sub unit 18 is arranged to move away from the edge 15 and toward the edge 16 by a distance of exactly one-tenth of an inch. At its maximum movement the zero point 24 will have been moved one-tenth of an inch relative to its starting point, so that when so moved the total distance between the zero point and the No. 1 graduation at 25 will be one and one-tenth inches. This maximum movement may be unnecessary as to effect such inch and one-tenth measurement, the slidable element could have been kept stationary in its normal position against edge 15, and the second graduation 28, i. e. the one next to the zero at 24, could have been read directly by the operator. Therefore, with the slide in its normal position, the scale or rule can read from the No. 1 graduation, anything from an exact inch, to one inch plus increments of one-tenth inch, until two inches are so read. Again, however, this latter reading would be unnecessary as it would be easier to read the two inches directly from the normal zero to the No. 2 graduation at 36. It is desirable, however, to add tenth inches to the even number inch readings to secure desired fractional readings. Of course, tenth inches are too coarse for the average use of the device, and it is, therefore, desired to be able to effect further and more minute subdivisions.

The slidable element 18 in the line of the ruler is mounted rigidly upon an intermediate guiding and supporting plate 39 and the latter has right and left guiding tongues, respectively 31 and 32, engaged under the shell 10 and its extension 29 carrying edge 16, and is slidable on frame 9. The fixed rule part 10 has forward spaced guide strips 33 and 34 respectively, between which the right tongue 31 is slidably guided, and the latter is longitudinally slotted as at 35, to receive the compression spring 36, and to form an abutment at the end of the slot, at 37, for the spring at one end of the latter. The under surface of shell 10 of the rule, upon which all of the previously described fixed calibrations appear, is longitudinally grooved at 40, terminating at abutment 41, to receive the spring 36, and with abutment 41, forming a stop against which the other end of the spring 36 abuts, and between which and abutment surface 37 the spring 36 is compressed. The slidable element also carries a second or left tongue 32, as noted, which is slidably guided between spaced guide elements 42—42 disposed beneath the shell extension 29, so that the slidable element is slidably but firmly guided at both side edges, to maintain an aligned position relative to the edge 11 of the scale. The slidable supporting element 39 upon which the shell element 18 is rigidly mounted is provided with a generally eccentrically or asymmetrically shaped opening 49, having a small end in which is disposed the rotatable roller element 43, suitably journalled upon a stud 44, mounted fixedly upon the supporting frame 9 connecting the two portions 29 and 10 of the shell. A cam element 45, having a constant rise from a low point 46 to a high point or dwell 47, is mounted rigidly upon a shaft 50 journalled in the slidable shell extension 18, and the upper free end of the latter is rigidly engaged by a knob 51. A calibrated annular pointer element or disc or its equivalent 52, is rigidly mounted on the shaft 50 and contains radial calibrations 53 and is angularly adjustable with the knob 51 and shaft 50 relative to a fixed datum line 54 on the shell extension 18. The spring 36 disposed in a spring chamber formed of vertically and laterally registering slot 35 and groove 40 in its preloaded condition between stops 37 and 41 urges the sub frame 39 longitudinally of the scale to cause the peripheral edge of cam 45 to engage the roller 43. When the angular disposition of the knob 51 and cam 45 is such that the zero point of the calibrations 53 is aligned with the datum line 54, the high point 47 of the cam 45 engages the roller 43, and the sub frame 39 and the mounted shell extension 18 are both disposed as far to the right as they can go, so that the lateral edge 15 of the scale or rule 10 is engaged by the juxtaposed lateral edge 22 of the slidable element 18. The zero point 24 of the latter is then exactly one complete unit, illustratively one inch, from the first calibration 25 on fixed scale 10. As the knob 51 is turned, and with it the cam 45, relative to the datum line, a certain number of the calibrations 53 on the pointer element 52 will pass by the datum line 54, while simultaneously the cam 45 in response to its angular change in position, will therefore move out from under or against roller 43, but the expansion of the spring 36 will continue to maintain cam and roller contact, while forming the sliding extension 18 and its mount 39 longitudinally of the scale away from edge 15. This moves the zero calibration 24 away from its starting point. Obviously, it also moves all other calibrations 28 on the slidable element 18, away from their respective starting points. With a full traverse of the cam between the high and low points, 47 to 46 thereof and with attainment of contact by low point 46 of the cam with the roller 43, one full tenth of an inch will have been traversed by sliding element 18, and hence of its zero line or calibrations from its starting position. If the graduations 53 on pointer or disc 52 are 100 between the maximum and minimum cam settings representing one-tenth of an inch, then each graduation 53 represents one-thousandth of an inch.

It will be understood that if the decimals of the inches to be measured are less than one-tenth of an inch, this can be determined in thousandths of an inch by subdividing the tenth of an inch into one hundred equal parts by turning knob 51 from its zero on datum line 54. This will move the zero calibration 24 from its starting position the desired number of thousandths of an inch. If the decimal of the inch beyond the even numbered inches happens to be more than one-tenth of an inch, the first one-tenth thereof is measured by utilizing as a zero the next calibration 28 to the zero calibration 24, and thereafter rotating the knob the desired angular distance to bring the selected calibration 53 opposite the datum line 54 representative of the selected number of thousandths of an inch of measurement change.

It is a feature of the invention to be able to measure without difficulty distances greater than the single length of the assembly. To this end the calibrations on the edge 11 extending at a lower level from the No. 1 calibration at 25 through all intermediate calibrations to the end one at 26, illustratively representing ten inches as indicated, will be practically doubled in effective length by adding in reverse at an upward level the calibrations beyond the numeral No. 10 at point 26, by the numeral No. 11, indicated at 59, and marking the scale in reverse at or opposite to the same calibration stations as the initial or primary lower level marking, until the end calibration at the inch mark No. 19 indicated at 55 is inscribed. Thus, to measure nineteen inches, plus whatever fraction of an inch is to be measured in addition, the fraction would be determined by the arbitrary setting of the zero mark in thousandths of an inch, or the zero mark setting plus the necessary number of full tenth inches, and this point will be suitably marked on the paper or other surface which is to bear the indications of the starting point. From such starting point the number of inches or analogous markings for which the scale is responsive, is marked, by making a mark at the end point 26 thereof. Thereafter the additional inches or the like to complete the total for which the markings are to be representative, are added by bodily shifting the ruler and placing the final number of desired inches of the upper level at the point previously marked for the final marking of the lowermost row, say, for instance, the designation for nineteen inches at graduation 55 of the upper row, and making a suitable marking impression on the surface.

Figure 4:
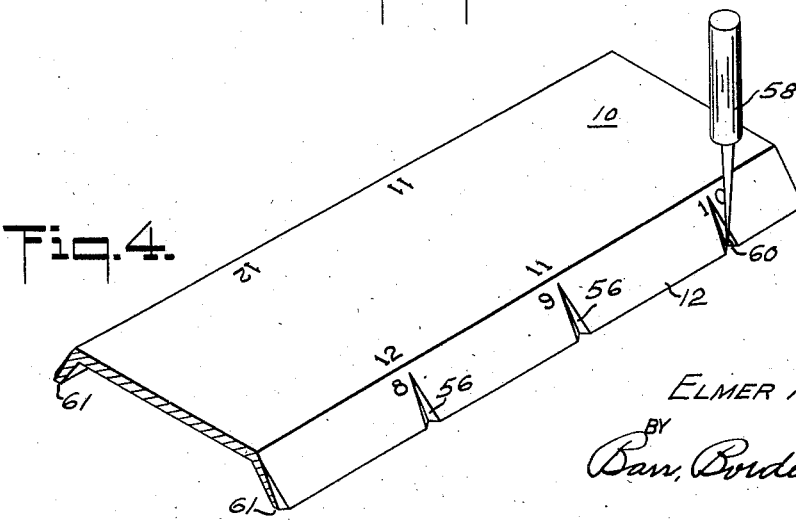
Fig. 4 represents a fragmentary perspective of the rule showing the utilization of the V-shaped notches for guiding a marking stylus or sharp pencil point to piercing or marking contact with a surface to transfer the measurements to such surface.

In order to expedite the proper and exact marking at the selected graduation, each graduation is aligned vertically with a transversely V-shaped substantially vertical groove, as at 56. As the groove is substantially vertical and is disposed in a sloping surface such as 11, the guide groove 56 merges into the sloping surface at the top in a line, and at the termination of the groove at the bottom of the sloping surface in bottom edge 61, where the latter contacts the paper or surface upon which it is to be marked, the groove is at its widest. As indicated in Fig. 4, a stylus 58 may be used with the sharp point 60 thereof guide vertically downwardly in a position of perpendicularity to the paper in order to pierce or mark the paper exactly in line with the graduations. This is an important feature in the exact use of the instrument. As noted, the same guide functions, precluding lateral shifting of the marking element in the outwardly flaring guide grooves 56, can be used for exact marking with a pencil or the like, as well as by a pricking or piercing stylus, as shown.

Having thus described my invention, I claim:

1. A rule comprising a frame, a shell and shell extension mounted on the frame and having a space between them, a roller mounted on the frame in said space, a sliding element mounted in the space, a disc-shaped cam rotatably mounted on the sliding element in position to engage the roller with the cam periphery, a shaft journalled in the sliding element upon which the cam is mounted, a control knob on the shaft and an indicating collar carried by said shaft, complemental datum and graduation means mounted respectively on the collar and element to predetermine the degree of angularity of the cam on its shaft from a starting zero, a calibration on the sliding element which in one position of the cam is the exact zero calibration of a series of evenly spaced graduations on the shell, and in the other extreme position of the cam is moved from the starting or normal zero point by a predetermined fraction of one of the spaces between said evenly spaced graduations.

2. A rule comprising a frame, a shell and shell extension mounted on the frame and having a space between them, a roller mounted on the frame in said space, a sliding element mounted in the space, a disc-shaped cam rotatably mounted on the sliding element in position to engage the roller with the cam periphery, a shaft journalled in the sliding element upon which the cam is mounted, a control knob on the shaft and an indicating collar carried by said shaft, complemental datum and graduation means mounted respectively on the collar and element to predetermine the degree of angularity of the cam on its shaft from a starting zero, a calibration on the sliding element which in one position of the cam is the exact zero calibration of a series of evenly spaced graduations on the shell, and in the other extreme position of the cam is moved from the starting or normal zero point by a predetermined fraction of one of the spaces between said evenly spaced graduations, means for guiding the sliding element, and resilient means urging the sliding element in such direction as to maintain contact of the cam edge and said roller.

3. A rule comprising a frame, a first and a second stop comprised respectively of a shell and a shell extension mounted on the frame and having a space between them, a roller mounted on the frame in said space, a sliding element of predeterminedly smaller width than said space longitudinally of said shell and shell extension and of identical length transversely thereof so that the respective edges of the shell extension and said element are in alignment, a disc-shaped cam rotatably mounted on the sliding element in position to engage the roller with the cam periphery, a shaft journalled in the sliding element upon which the cam is mounted, a control knob on the shaft, an indicating collar carried by said shaft, and complemental datum and graduation means mounted respectively on the collar and element to predetermine the degree of angularity of the cam on its shaft from a starting zero at which one lateral edge of said sliding element is substantially juxtaposed to the lateral edge of one of said stops as one extreme of cam position, and the other lateral edge of said sliding element being substantially juxtaposed to the lateral edge of the other of said stops in the other extreme positioning of said cam, the relation of said graduations and datum line between the extreme cam positions being an angular function of the space relation of the sliding element to the respective stops.

ELMER A. ERMOLD.

REFERENCES CITED

The following references are of record in the file of this patent:

UNITED STATES PATENTS

| Number | Name | Date |
| --- | --- | --- |
| 8,398 | Parsons | Sept. 30, 1851 |
| 1,728,420 | Little | Sept. 17, 1929 |
| 2,104,194 | Glouton | Jan. 4, 1938 |